United States Patent
An et al.

(10) Patent No.: US 7,223,804 B2
(45) Date of Patent: May 29, 2007

(54) POLYCARBONATE COMPOSITION

(75) Inventors: Yuxian An, Shanghai (CN); Ye-Gang Lin, Evansville, IN (US); Rajendra Kashinath Singh, Evansville, IN (US)

(73) Assignee: General Electric Company, Schenectady, NY (US)

( * ) Notice: Subject to any disclaimer, the term of this patent is extended or adjusted under 35 U.S.C. 154(b) by 391 days.

(21) Appl. No.: 10/748,756

(22) Filed: Dec. 30, 2003

(65) Prior Publication Data

US 2005/0148719 A1    Jul. 7, 2005

(51) Int. Cl.
*C08K 5/42* (2006.01)
(52) U.S. Cl. .................. 524/165; 523/201; 525/69
(58) Field of Classification Search ........... 524/165; 523/201; 525/69
See application file for complete search history.

(56) References Cited

U.S. PATENT DOCUMENTS

| | | |
|---|---|---|
| 3,511,895 A | 5/1970 | Kydonieus et al. |
| 3,635,895 A | 1/1972 | Kramer .................. 260/47 XA |
| 3,775,367 A | 11/1973 | Nouvertne ................ 260/45.9 |
| 3,981,944 A | 9/1976 | Okamoto et al. |
| 3,988,389 A | 10/1976 | Margotte et al. |
| 4,001,184 A | 1/1977 | Scott .................... 260/47 XA |
| 4,046,836 A | 9/1977 | Adelmann et al. |
| 4,126,602 A | 11/1978 | Salee |
| 4,154,775 A | 5/1979 | Axelrod |
| 4,217,438 A | 8/1980 | Brunelle et al. ............. 528/202 |
| 4,238,597 A | 12/1980 | Markezich et al. |
| 4,272,584 A | 6/1981 | Goldberg et al. |
| 4,304,709 A | 12/1981 | Salee |
| 4,305,856 A | 12/1981 | Sakano et al. |
| 4,391,935 A | 7/1983 | Bialous et al. |
| 4,473,685 A | 9/1984 | Mark |
| 4,487,896 A | 12/1984 | Mark et al. |
| 4,515,921 A | 5/1985 | Witman |
| 4,530,965 A | 7/1985 | Bourland |
| 4,569,970 A | 2/1986 | Paul et al. |
| 4,579,906 A | 4/1986 | Zabrocki et al. |
| 4,600,632 A | 7/1986 | Paul et al. |
| 4,654,400 A | 3/1987 | Lohmeijer et al. ............ 525/64 |
| 4,696,972 A | 9/1987 | Bourland |
| 4,746,701 A | 5/1988 | Kress et al. |
| 4,767,818 A | 8/1988 | Boutni |
| 4,782,115 A | 11/1988 | Paul et al. |
| 4,788,252 A | 11/1988 | de Boer et al. |
| 4,927,880 A | 5/1990 | DeRudder et al. |
| 4,931,503 A | 6/1990 | Boutni et al. |
| 4,983,658 A | 1/1991 | Kress et al. |
| 4,997,883 A | 3/1991 | Fischer et al. ................ 525/67 |
| 5,023,297 A | 6/1991 | Boutni |
| 5,036,126 A | 7/1991 | Rinehart et al. ............. 524/141 |
| 5,063,259 A * | 11/1991 | Wanat et al. ................ 523/201 |
| 5,109,076 A | 4/1992 | Freitag et al. |
| 5,126,428 A | 6/1992 | Freitag et al. |
| 5,185,399 A | 2/1993 | Inoue |
| 5,266,618 A | 11/1993 | Watanabe et al. |
| 5,322,882 A | 6/1994 | Okamoto |
| 5,360,861 A | 11/1994 | Campbell |
| 5,380,795 A | 1/1995 | Gosens et al. |
| 5,391,600 A | 2/1995 | Umeda et al. |
| 5,391,603 A | 2/1995 | Wessel et al. |
| 5,414,045 A | 5/1995 | Sue et al. |
| 5,451,624 A | 9/1995 | Memon et al. .............. 524/151 |
| 5,451,632 A | 9/1995 | Okumura et al. |
| 5,488,086 A | 1/1996 | Umeda et al. |
| 5,521,230 A | 5/1996 | Bhatia et al. |
| 5,530,083 A | 6/1996 | Phelps et al. |
| 5,602,201 A | 2/1997 | Fujiguchi et al. |
| 5,608,026 A | 3/1997 | Hoover et al. |
| 5,616,674 A | 4/1997 | Michel et al. |
| 5,658,974 A | 8/1997 | Fuhr et al. .................. 524/127 |
| 5,723,541 A | 3/1998 | Ingenito et al. |
| 6,001,929 A | 12/1999 | Nodera et al. |
| 6,072,011 A | 6/2000 | Hoover |
| 6,306,507 B1 | 10/2001 | Brunelle et al. |
| 6,308,142 B1 | 10/2001 | Choate et al. |
| 6,391,965 B1 | 5/2002 | Koura et al. |
| 6,545,089 B1 | 4/2003 | DeRudder et al. ............ 525/63 |
| 6,559,270 B1 | 5/2003 | Siclovan et al. |
| 6,576,706 B1 | 6/2003 | Nodera et al. |
| 6,596,794 B1 | 7/2003 | Eckel et al. |
| 6,613,820 B2 | 9/2003 | Fujiguchi et al. |
| 6,657,018 B1 | 12/2003 | Hoover |
| 2003/0092837 A1 | 5/2003 | Eichenauer |
| 2003/0105226 A1 | 6/2003 | Cella et al. |
| 2003/0119986 A1 | 6/2003 | Eichenauer |

(Continued)

FOREIGN PATENT DOCUMENTS

BE    1006984 A3    2/1995

(Continued)

OTHER PUBLICATIONS

JP54040852. Publication Date Mar. 31, 1979. Flame Retardant Resin Composition. (Abstract Only).

(Continued)

*Primary Examiner*—Peter Szekely (57) ABSTRACT

A thermoplastic composition comprises polycarbonate, an impact modifier having a pH of about 3 to about 7, and a flame retardant essentially free of bromine and chlorine.

33 Claims, 4 Drawing Sheets

U.S. PATENT DOCUMENTS

| | | |
|---|---|---|
| 2003/0181573 A1* | 9/2003 | Miyatake et al. .......... 524/504 |
| 2003/0191245 A1 | 10/2003 | Nodera et al. |
| 2003/0203990 A1 | 10/2003 | DeRudder et al. |
| 2004/0059031 A1 | 3/2004 | Seidel et al. |
| 2004/0102549 A1 | 5/2004 | Bajgur et al. |
| 2004/0220330 A1 | 11/2004 | DeRudder et al. |
| 2005/0074156 A1 | 4/2005 | Holupka et al. |
| 2006/0004154 A1 | 1/2006 | DeRubber et al. |
| 2006/0030647 A1 | 2/2006 | Ebeling et al. |
| 2006/0142486 A1 | 6/2006 | DeRubber et al. |

FOREIGN PATENT DOCUMENTS

| | | |
|---|---|---|
| DE | 4016417 A1 | 11/1991 |
| DE | 40 24 667 A1 | 2/1992 |
| EP | 0 186 917 B1 | 10/1985 |
| EP | 0206006 | 12/1986 |
| EP | 0 266 596 B1 | 10/1987 |
| EP | 0 272 425 B1 | 11/1987 |
| EP | 0247430 B1 | 12/1987 |
| EP | 0248308 A2 | 12/1987 |
| EP | 0254054 B1 | 1/1988 |
| EP | 0595187 | 1/1988 |
| EP | 0 326 938 B1 | 1/1989 |
| EP | 0283776 | 2/1989 |
| EP | 0369345 A2 | 5/1990 |
| EP | 0376052 B1 | 7/1990 |
| EP | 0387570 B1 | 9/1990 |
| EP | 0522753 A2 | 1/1993 |
| EP | 0 635 547 A2 | 7/1994 |
| EP | 0645422 A1 | 3/1995 |
| EP | 0434848 B1 | 9/1995 |
| EP | 0 707 045 B1 | 10/1995 |
| EP | 0692522 B1 | 1/1996 |
| EP | 0 780 438 A2 | 12/1996 |
| EP | 0520186 | 12/1997 |
| EP | 000900827 A2 * | 3/1999 |
| EP | 0517927 B1 | 6/1999 |
| EP | 0933396 | 12/1999 |
| EP | 0524731 | 3/2002 |
| EP | 1162235 | 12/2003 |
| EP | 0936243 | 12/2006 |
| GB | 2043083 A | 10/1980 |
| JP | 58011540 | 1/1983 |
| JP | 6322545 | 11/1994 |
| JP | 7082467 | 3/1995 |
| JP | 10-007897 | 1/1998 |
| JP | 2003171547 | 6/2003 |
| WO | WO 80/00084 | 1/1980 |
| WO | 8600083 | 1/1986 |
| WO | WO 91/18052 | 11/1991 |
| WO | WO 01/72905 | 10/2001 |
| WO | WO 02/50185 A2 | 6/2002 |
| WO | 03025061 | 6/2003 |
| WO | 05037921 | 4/2005 |

OTHER PUBLICATIONS

DE 4016417; Polycarbonate flame retardant alloys- contain copolymer, graft polymer and poly:organo:siloxane-polycarbonate block copolymer, for good mechanical properties: Publication Date: Nov. 28, 1991; Abstract.

DE 4024667; Publication Date: Feb. 6, 1992 (translation of abstract only).

EP 0247430; Publication Date: Dec. 2, 1987 (translation of abstract only).

EP 0248308; Publication Date: Dec. 9, 1987 (translation of abstract only).

EP 0387570; Publication Date: Sep. 19, 1990 (translation of abstract only).

JP 56014549; Thermoplastic resin composition having good heat cycle property; Publication Date: 1981-15-15; Abstract.

JP 04225062; Publication Date: Aug. 14, 1992 (translation of abstract only).

JP10007897; Publication Date: Jan. 13, 1998 (translation of abstract only).

JP 10101920; Polycarbonate resin composition; Publication Date: Apr. 21, 1998; Abstract.

JP 4298554; Flame-retardant resin composition; Publication Date Oct. 22, 1992; Abstract.

JP58011540; Thermoplastic resin composition; Publication Date: Jan. 22, 1983; Abstract.

JP6322545; Plated resin product; Publication Date: Nov. 22, 1994; Abstract.

JP7082467; Impact-resistant resin composition; Publication Date: Mar. 28, 1995; Abstract.

BE 10 06984; Publication Date: Feb. 7, 1995 (translation of abstract only).

ASTM D256 Standard Test Methods for Determining the Izod Pendulum Impact Resistance of Plastics, 20 pages.

International Search Report for International application No. PCT/us2004/041947 Mailed Apr. 22, 2005.

UL94 Tests for Flammability of Plastic Materials for Parts in Devices and Appliances, 52 pages.

JP07196873; Flame-Retardant Resin Composition; Publication Date: Jan. 8, 1995; Abstract.

* cited by examiner

POLYCARBONATE COMPOSITION

BACKGROUND OF INVENTION

The disclosure related to polycarbonate compositions, particularly to impact modified polycarbonate compositions.

Addition of rubbery impact modifiers is commonly used to improve the toughness of aromatic carbonate polymer compositions. It is particularly desirable for impact modified polycarbonate compositions to have ductile properties below freezing temperatures (0° C.) so that the compositions may be employed in a range of temperatures and conditions. In many applications the compositions must also be flame retardant. Unfortunately, the inclusion of rubbery impact modifiers often has a negative impact on flame retardancy. Halogenated flame retardants have, in the past, provided flame retardancy without a significant negative impact on physical properties. Due to environmental concerns however it is considered important to employ flame retardants that are free of bromine and chlorine. Some commonly used flame retardants that are free of chlorine and bromine frequently must be used in amounts that have a negative impact on physical properties. Thus, the combination of flame retardancy and desirable physical properties, particularly ductility, can be difficult to achieve, especially at a thickness less than 5 millimeters (mm).

Accordingly, there is a need for an impact modified polycarbonate composition with good physical properties and flame retardancy at a thickness less than 5 mm.

BRIEF DESCRIPTION OF THE INVENTION

The above mentioned need is met by a thermoplastic composition comprising polycarbonate, an impact modifier having a pH of about 3 to about 7, and a flame retardant essentially free of bromine and chlorine.

DETAILED DESCRIPTION

A thermoplastic composition comprises polycarbonate, an impact modifier having a pH of about 3 to about 7, and a flame retardant essentially free of chlorine and bromine. The composition can achieve a V1 rating or better according to UL94 at a thickness of about 1 to about 1.5 mm. The composition has a ductile-brittle transition temperature at or below −25° C. according to ASTM D256 (notched Izod).

The thermoplastic composition may be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the flame retardant it is based on the total weight of the flame retardant. When this definition is applied to the thermoplastic composition it is based on the total weight of polycarbonate, impact modifier and flame retardant.

As used herein, polycarbonate includes compositions having structural units of the formula (I):

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$$-A^1-Y^1-A^2 \qquad (II)$$

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the reaction of a dihydroxy compound with a carbonate precursor, such as phosgene, a haloformate, a carbonate or carbonate ester and generally in the presence of an acid acceptor and a molecular weight regulator. The carbonate or carbonate ester may be substituted or unsubstituted. As used herein, the term "dihydroxy compound" includes, for example, bisphenol compounds having general formula (III) as follows:

wherein $R^a$ and $R^b$ each represent a halogen atom or a monovalent hydrocarbon group and may be the same or different; p and q are each independently integers from 0 to 4; and $X^a$ represents one of the groups of formula (IV):

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes the following:
1,1-bis(4-hydroxyphenyl) methane;
1,1-bis(4-hydroxyphenyl) ethane;
2,2-bis(4-hydroxyphenyl) propane (hereinafter "bisphenol A" or "BPA");
2,2-bis(4-hydroxyphenyl) butane;
2,2-bis(4-hydroxyphenyl) octane;
1,1-bis(4-hydroxyphenyl) propane;
1,1-bis(4-hydroxyphenyl) n-butane;
bis(4-hydroxyphenyl) phenylmethane;
2,2-bis(4-hydroxy-1-methylphenyl) propane;
1,1-bis(4-hydroxy-t-butylphenyl) propane;
2,2-bis(4-hydroxy-3-bromophenyl) propane;
1,1-bis(4-hydroxyphenyl) cyclopentane; and
1,1-bis(4-hydroxyphenyl) cyclohexane.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid and benzophenone tetracarboxylic acid. The branching agents may be added at a level of about 0.05 to about 2.0 weight percent. Branching agents and procedures for making branched polycarbonates are described in U.S. Pat. Nos. 3,635,895 and 4,001,184 which are incorporated by reference. All types of polycarbonate end groups are contemplated.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000, more preferably about 10,000 to about 65,000, and most preferably about 15,000 to about 35,000, as determined by gel permeation chromatography.

The polycarbonate is present in an amount of about 95 to about 99 weight percent, based on the total weight of the polycarbonate and impact modifier. Within this range the polycarbonate may be present in an amount greater than or equal to about 94 weight percent, greater than or equal to about 95 weight percent or greater than or equal to about 96 weight percent. Also within this range the polycarbonate may be present in an amount less than or equal to about 98 weight percent or less than or equal to about 97 weight percent.

The impact modifier may be an acrylate impact modifier or a diene rubber impact modifier. Preferably an acrylate impact modifier is selected from the group consisting of methacrylate-butadiene-styrene (MBS), poly(butyl-acrylate)-methyl-methacrylate, poly(butyl-acrylate cosiloxane)-methyl-methacrylate and combinations of two or more of the foregoing. Poly(butyl-acrylate cosiloxane)-methyl-methacrylate is an impact modifier with a core consisting of butylacrylate and siloxane copolymer and a shell consisting of methyl methacrylate. Poly(butyl-acrylate)-methyl-methacrylate is an impact modifier with a core of butyl-acrylate and a methyl methacrylate shell. The pH of the impact modifier should be such that it does not have a negative impact on the flame retardants and the physical properties of the composition. Without being bound by theory it is believed that use of an impact modifier having a pH less than 3 could degrade the polycarbonate resulting in significant changes in physical properties. Accordingly, the impact modifier preferably has a pH of about 3 to about 7. Within this range the pH may be less than or equal to about 6.5, or less than or equal to about 6.0. Also within this range, the pH may be greater than or equal to about 3.2, greater than or equal to about 3.4, or greater than or equal to about 3.6. If an impact modifier does not already have the desired pH then the pH may be achieved through the addition of a sufficient amount of acid or base to attain the desired pH.

In one embodiment the acid is a phosphorous containing oxy-acid. The phosphorous containing oxy-acid is preferably a multi-protic phosphorus containing oxy-acid having the general formula $H_mP_tO_n$ where m and n are each 2 or greater and t is 1 or greater; or a tri-ester of a multi-protic phophorus containing acid having the general formula $(R_1O)(R^2O)(R^3O)H_xP_yO_{z-3}$ where x may be zero or a positive integer and z may be 3 or greater, y is 1 or greater, and $R^1$, $R^2$, and $R^3$ are organic radicals. Exemplary acids include one or more of the following, phosphoric acid, phosphorous acid, hypophosphorous acid, phosphinic acid, phosphonic acid, metaphosphoric acid, hexametaphosphoric acid, thiophosphoric acid, fluorophosphoric acid, difluorophsphoric acid, fluorophosphorous acid, difluorophosphorous acid, fluorohypophosphorous acid, and fluorohypophosphoric acid.

Alternatively the desired pH may be attained by mixing impact modifiers having different pH values to attain an admixture with the desired pH. The pH of the impact modifier can affect the pH of the composition.

The impact modifier is present in an amount of about 0.5 to about 5 weight percent, based on the total weight of the polycarbonate. Within this range the impact modifier may be present in an amount greater than or equal to about 1, greater than or equal to about 1.5 or greater than or equal to about 2 parts by weight. Also within this range the impact modifier may be present in an amount less than or equal to about 4.5, less than or equal to about 4 or less than or equal to about 3.5 parts by weight.

Useful flame retardants are salt based flame retardants, such as alkali metal or alkaline earth metal salts of inorganic protonic acids as well as organic Bronsted acids comprising at least one carbon atom. These salts should not contain chlorine and/or bromine. Preferably the salt based flame retardants are sulfonic acid salts. Non-limiting examples of sulfonic acid salts are perfluoroalkane sulfonate alkali metal, $C_1$–$C_6$ alkylammonium, or ammonium salts. Such salts are described in the above-mentioned U.S. Pat. No. 3,775,367, and include, for example, salts such as sodium, potassium, or tetraethyl ammonium perfluoromethylbutane sulfonate; sodium, potassium, or tetraethyl ammonium perfluoromethane sulfonate; sodium, potassium, or tetraethyl ammonium perfluoroethane sulfonate; sodium, potassium, or tetraethyl ammonium perfluoropropane sulfonate; sodium, potassium, or tetraethyl ammonium perfluorohexane sulfonate; sodium, potassium, or tetraethyl ammonium perfluoroheptane sulfonate; sodium, potassium, or tetraethyl ammonium perfluoroctanesulfonate; sodium, potassium, or tetraethyl ammonium perfluorobutane sulfonate; and sodium, potassium, or tetraethyl ammonium diphenylsulfon-3-sulfonate; and mixtures of two or more of the foregoing salts. In one embodiment the flame retardant is selected from the group consisting of potassium diphenylsulfon-3-sulfonate (KSS), potassium perfluorobutane-sulfonate (Rimar salt), potassium perfluoromethane-sulfonate and combinations comprising at least one of the foregoing. Other flame retardants are phenylpolysiloxanes, such as poly(phenylmethyl siloxane) and octaphenyltetracyclosiloxane. Potassium-perfluorobutane-sulfonate is available from 3M and Bayer, and potassium-diphenylsulfon-3-sulfonate is available from Seal Sands.

The flame retardant is present in an amount of about 0.005 to about 2 weight percent, based on the weight of the polycarbonate. Within this range the flame retardant may be present in an amount greater than or equal to about 0.01 or greater than or equal to about 0.02 weight percent. Also within this range the flame retardant may be present in an amount less than or equal to about 1.5, or less than or equal to about 1.0 weight percent.

The composition may further comprise polytetrafluoroethylene (PTFE). PTFE is typically added as an additive known as TSAN. TSAN is made by copolymerizing styrene and acrylonitrile in the presence of an aqueous dispersion of PTFE. Typically TSAN contains 50 parts by weight (pbw) PTFE and 50 pbw of a styrene-acrylonitrile copolymer containing 75 wt % styrene and 25 wt % acrylonitrile). In some cases the polytetrafluoroethylene is encapsulated in the styrene acrylonitrile resin. Useful amounts of TSAN are about 0.02 to about 1.5 weight percent, based on the total weight of the polycarbonate. Within this range TSAN may be present in an amount greater than or equal to about 0.07 or greater than or equal to about 0.1 weight percent. Also within this range TSAN may be present in an amount less than or equal to about 1.2 or less than or equal to about 1.0 or less than or equal to about 0.5 weight percent.

The composition may include one or more various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; and blowing agents. Examples of fillers or reinforcing agents include glass fibers, glass beads, carbon fibers, silica, talc and calcium carbonate. Examples of heat stabilizers include triphenyl phosphite, tris-(2,6-dimethylphenyl) phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include pentaerythritoltetrastearate, stearyl stearate, beeswax, montan wax and paraffin wax. Examples of other resins include but are not limited to polypropylene, polystyrene, polymethyl methacrylate, and poly(arylene ether). Combinations of any of the foregoing additives may be used. Such additives may be mixed at a suitable time during the mixing of the components for forming the composition.

The compositions may be made by intimately mixing or otherwise contacting the polycarbonate and impact modifier, flame retardant and any other additives either in solution or in melt, using any known mixing or blending method. Typically, there are two distinct mixing steps: a premixing step and a melt mixing step. In the premixing step, the ingredients are mixed together. This premixing step is typically performed using a tumbler mixer or a ribbon blender. However, if desired, the premix may be manufactured using a high shear mixer such as a Henschel mixer or similar high intensity device. The premixing step must be followed by a melt mixing step where the premix is melted and mixed again as a melt. Alternatively, it is possible to eliminate the premixing step, and simply add the raw materials directly into the feed section of a melt mixing device (such as an extruder) via separate feed systems. In the melt mixing step, the ingredients are typically melt kneaded in a single screw or twin screw extruder, and extruded as pellets.

The composition is further illustrated by the following non-limiting examples.

EXAMPLES

The materials employed in the following examples are listed in Table 1.

TABLE 1

| COMPONENT | DESCRIPTION/SUPPLIER |
|---|---|
| Polycarbonate I | A high flow grade Lexan resin having a weight average molecular weight of about 22,000 g/mol. Lexan resins are available from GE Plastics. |
| Polycarbonate II | 100 grade Lexan resin having a weight average molecular weight of about 29,500 g/mol. |
| Irgofos 168 | A heat stabilizer available from Great Lakes Chemicals |
| PETS | Pentaerythritoltetrastearate, a mold release agent |
| TSAN | Polytetrafluoroethylene encapsulated in styrene acrylonitrile resin as described above |
| C4 K-RIMAR | Potassium perfluorobutane sulfonate available from 3M |
| C1 K-RIMAR | Potassium perfluoromethane sulfonate available from 3M |
| MBS I | Methacrylate-butadiene-styrene available from Rohm & Haas having a pH of 7.2 in deionized water |
| 45% $H_3PO_4$ | Phosphorous acid (45 weight % in deionized water) |
| DI water | Deionized water |
| MBS II | Methacrylate-butadiene-styrene available from GE Plastics having a pH of 3.5 in deionized water |

Flammability tests were performed following the procedure of Underwriter's Laboratory Bulletin 94 entitled "Tests for Flammability of Plastic Materials, UL94". According to this procedure, the materials were classified as either UL94 HB, UL94 V0, UL94 V1 or UL94 V2 on the basis of the test results obtained for five samples. The criteria for each of these flammability classifications according to UL94, are described below.

HB: In a 5 inch sample, placed so that the long axis of the sample is horizontal to the flame, the rate of burn of the sample is less than 3 inches per minute, and the flames should be extinguished before 4 inches of sample are burned.

V0: In a sample placed so that its long axis should be 180 degrees to the flame, the average period of flaming and/or smoldering after removing the igniting flame should not exceed five seconds and none of the vertically placed samples should produce drips of burning particles which ignite absorbent cotton. Five bar flame out time (FOT) is the sum of the flame out time for five bars, each lit twice for a maximum flame out time of 50 seconds.

V1: In a sample placed so that its long axis should be 180 degrees to the flame, the average period of flaming and/or smoldering after removing the igniting flame should not exceed twenty-five seconds and none of the vertically placed samples should produce drips of burning particles which ignite absorbent cotton. Five bar flame out time is the sum of the flame out time for five bars, each lit twice for a maximum flame out time of 250 seconds.

V2: In a sample placed so that its long axis should be 180 degrees to the flame, the average period of flaming and/or smoldering after removing the igniting flame should not exceed twenty-five seconds and the vertically placed samples produce drips of burning particles which ignite cotton. Five bar flame out time is the sum of the flame out time for five bars, each lit twice for a maximum flame out time of 250 seconds.

The data was analyzed by calculation of the average flame out time, standard deviation of the flame out time, as the total number of drips, and using statistical methods to convert that data to a prediction of the probability of first time pass, or "p(FTP)", that a particular sample formulation would achieve a V0 "pass" rating in the conventional UL94 testing of 5 bars. Preferably p(FTP) will be as close to 1 as possible, for example greater than 0.9 and more preferably greater than 0.95, for maximum flame-retardant performance in UL testing.

Examples 1–5

Compositions as shown in Table 2 were produced by melt blending the components. The composition was pelletized and then formed into the appropriate test specimens. Flame retardancy was tested on specimens with a thickness of 1.1 mm. Data is shown in Table 2.

TABLE 2

| Component | 1 | 2 | 3 | 4 | 5* |
|---|---|---|---|---|---|
| Polycarbonate I | 50 | 50 | 50 | 50 | 50 |
| Polycarbonate II | 50 | 50 | 50 | 50 | 50 |
| Irgofos 168 | 0.05 | 0.05 | 0.05 | 0.05 | 0.05 |
| PETS | 0.35 | 0.35 | 0.35 | 0.35 | 0.35 |
| TSAN | 0.2 | 0.2 | 0.2 | 0.2 | 0.2 |
| C4 K-RIMAR | 0.040 | 0.040 | 0.025 | 0.025 | 0.033 |
| MBS I | 2.00 | 3.50 | 3.50 | 2.00 | 2.75 |
| 45% H3PO4 | 0.00020 | 0.00035 | 0.00020 | 0.00035 | 0.00000 |
| DI Water | 0.050 | 0.050 | 0.050 | 0.050 | 0.050 |
| UL94 V0–V2 at 1.1 mm | | | | | |
| 5-Bar Flame Out Time | 30.5 | 65.5 | 79.5 | 31 | 47.5 |
| Rating | V0 | V1 | V1 | V0 | V1 |
| ASTM Notched Izod Test | | | | | |
| IS at RT[1] | 14.7 (786) | 13.7 (733) | 13.5 (722) | 14.5 (776) | 16.0 (856) |
| Duc. at RT[2] | 100% | 100% | 100% | 100% | 100% |
| D/B trans. Temp.[3] | −25° C. | −30° C. | −25° C. | −25° C. | −15° C. |

*Comparative Example
[1]Impact strength at room temperature as determined by ASTM D256 in unit of lbf/in. Values in parenthesis are in Newtons based on mathematical conversion.
[2]Ductility at room temperature indicates the percentage of ductile breaking at room temperature
[3]Ductile/brittle transition temperature indicates the temperature where 50% ductility is projected.

Table 2 indicates that adding a few parts per million of phosphorous acid can help the rubber impact modified polycarbonate to achieve V0 rating at a thickness of 1.1 millimeters. Statistic analysis of the above flame retardance test results also suggests that adding phosphorous acid reduces flame out time and hence increases the probability of passing UL V0 test. It is surprisingly found that, when the pH of the impact modifier is decreased (Examples 1 to 4) the composition shows V0 flame performance compared to Example 5 in which the pH was unmodified.

Examples 6–11

Compositions as shown in Table 3 were produced by melt blending the components. The composition was pelletized and then formed into the appropriate test specimens. Flame retardancy was tested on specimens with a thickness of 1.1 mm. Data is shown in Table 3.

TABLE 3

| Component | 6* | 7 | 8 | 9 | 10 | 11 |
|---|---|---|---|---|---|---|
| Polycarbonate I | 50 | 50 | 50 | 50 | 50 | 50 |
| Polycarbonate II | 50 | 50 | 50 | 50 | 50 | 50 |
| Irgofos 168 | 0.05 | 0.05 | 0.05 | 0.05 | 0.05 | 0.05 |
| PETS | 0.35 | 0.35 | 0.35 | 0.35 | 0.35 | 0.35 |
| TSAN | 0.2 | 0.2 | 0.2 | 0.2 | 0.2 | 0.2 |
| C4 K-RIMAR | 0.03 | 0.03 | 0.03 | 0.03 | 0.03 | 0.03 |
| MBS I | 3 | 2.4 | 1.8 | 1.2 | 0.6 | 0 |
| MBS II | 0 | 0.6 | 1.2 | 1.8 | 2.4 | 3 |

TABLE 3-continued

| Component | 6* | 7 | 8 | 9 | 10 | 11 |
|---|---|---|---|---|---|---|
| | | UL94 V0–V2 at 1.1 mm | | | | |
| 5-Bar FOT | 71 | 51.5 | 47.5 | 29.9 | 45.4 | 46.3 |
| Rating | V1 | V1 | V1 | V0 | V1 | V1 |
| | | ASTM Notched Izod Test | | | | |
| IS at RT[1] | 15.5 (829) | 15.5 (829) | 16.0 (856) | 15.5 (829) | 15.2 (813) | 14.3 (765) |
| Duc. At TR[2] | 100% | 100% | 100% | 100% | 100% | 100% |
| D/B Trans.[3] | −35° C. | −35° C. | −35° C. | −35° C. | −45° C. | −35° C. |
| | | Melt Viscosity and Stability Test | | | | |
| Initial Viscosity[4] | 5072 | 5092 | 5182 | 5272 | 5436 | 5127 |
| Visc. Change[5] | −4.2% | −3.2% | −1.8% | −1.9% | −2.3% | −2.5% |

*Comparative Example
Impact strength at room temperature as determined by ASTM D256 in unit of lbf/in. Values in parenthesis are in Newtons based on mathematical conversion.
[2]Ductility at room temperature indicates the percentage of ductile breaking at room temperature
[3]Ductile/brittle transition temperature indicates the temperature where 50% ductility is projected
[4]Melt viscosity and stability were tested on a dynamic rheometer (Rheometric ARES) with parallel plates fixture. The initial viscosity (in units of poise) and the viscosity change were tested at 300° C. with 6 minutes dwell time prior to the starting of test. The test lasted 12 minutes.

Figure 2:
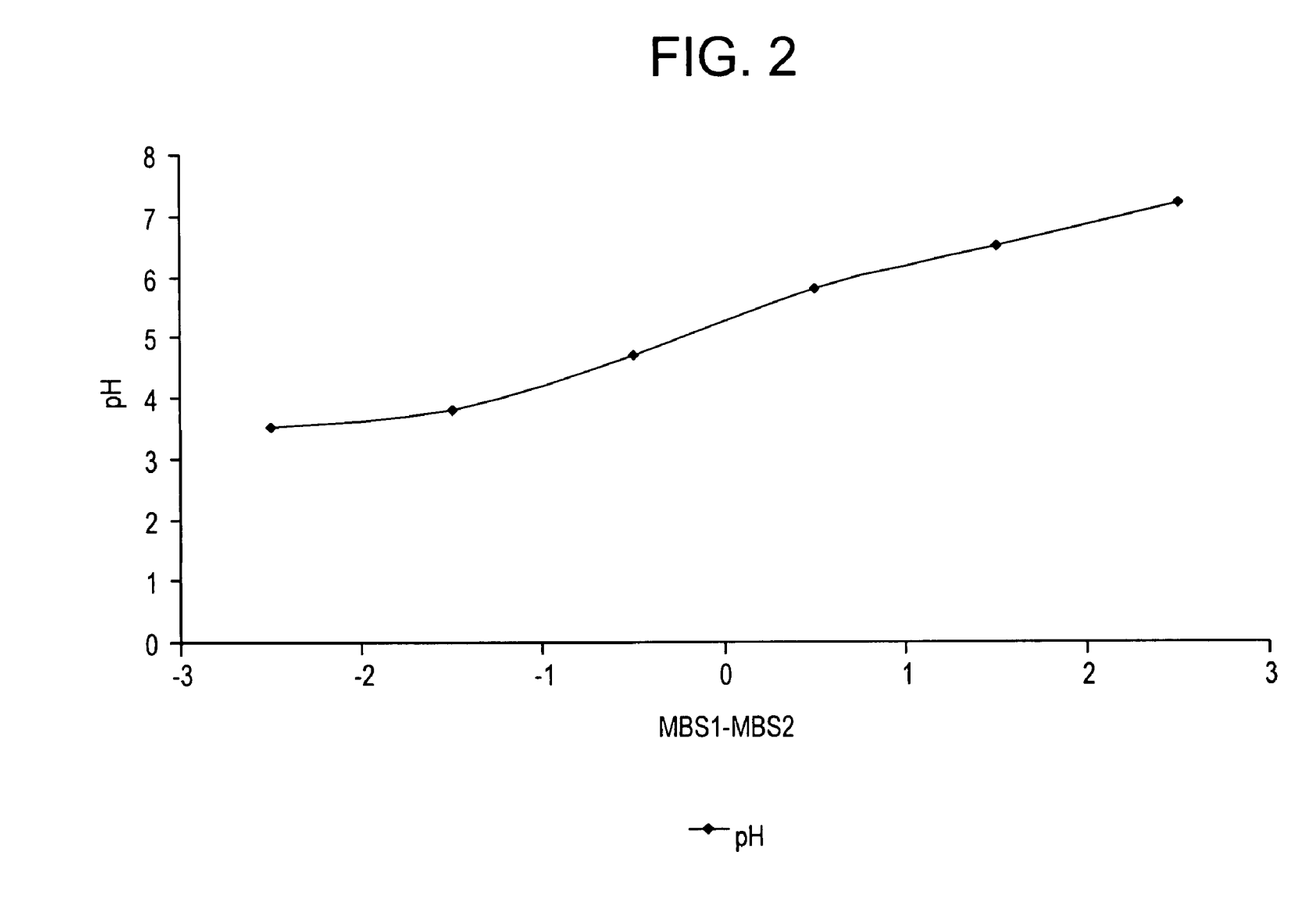
FIG. 2 is a graph relating pH to the content of different MBS rubbers in a blend.

In Examples 7–11, MBS II was used to adjust the pH value of the impact modifier composition. FIG. 2 is a graph relating the MBS content to the pH of the mixtures of MBS I and MBS II based on data from Table 4. In the absence of phosphorous acid, MBS II resulted in shorter flame out time than MBS I, while the combination of MBS I and MBS II in a ratio of 1.2:1.8 exhibited the shortest flame out time and achieved V0 rating at 1.1 millimeters (Example 9).

Figure 3:
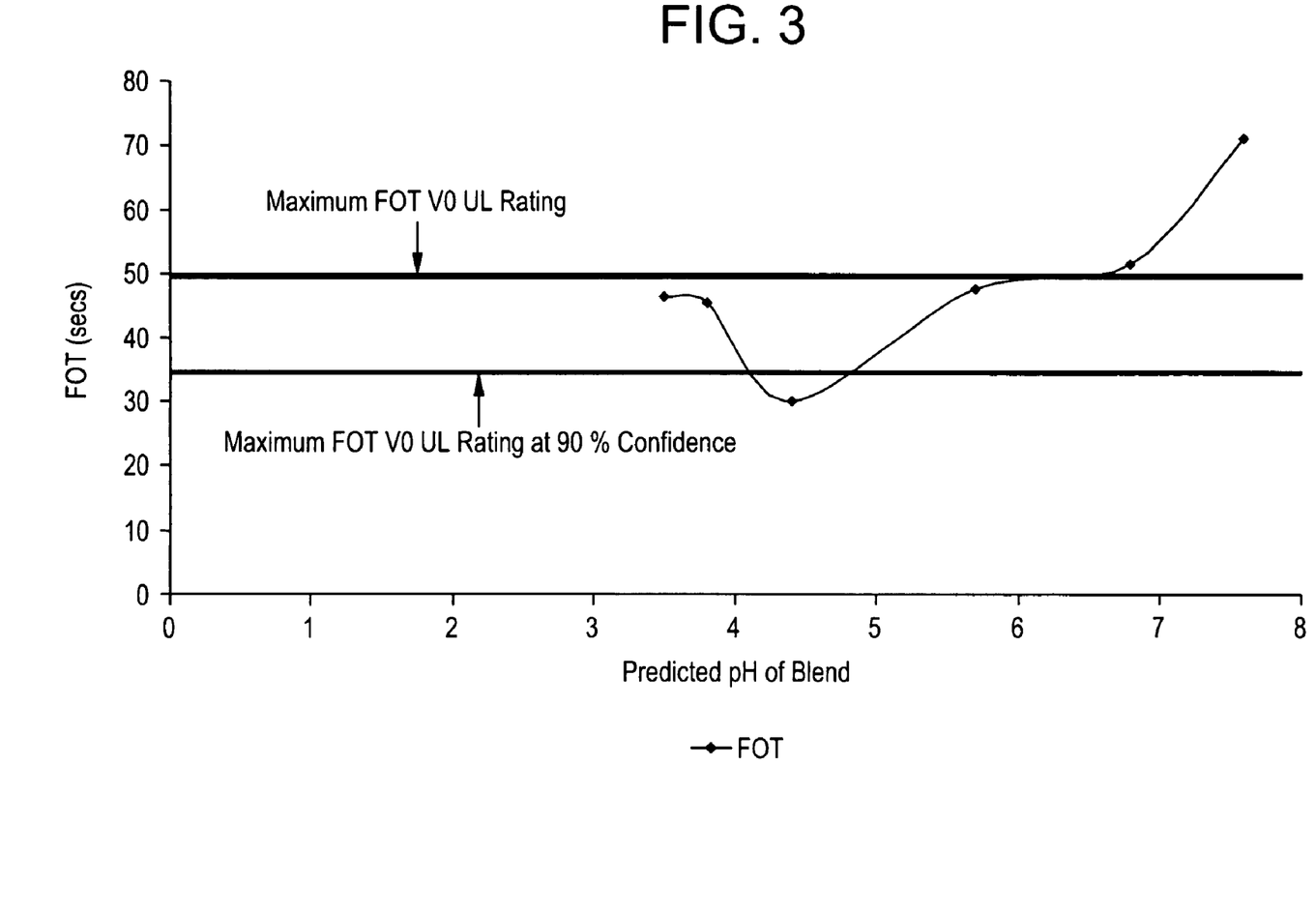
FIG. 3 is a graph relating flame out time to predicted pH for the data in Table 3.

FIG. 3 relates the predicted pH of the MBS blend to the flame retardance performance. As can be seen from FIG. 3 a pH of about 3 to about 7 is important to obtaining a V0 rating.

Figure 1:
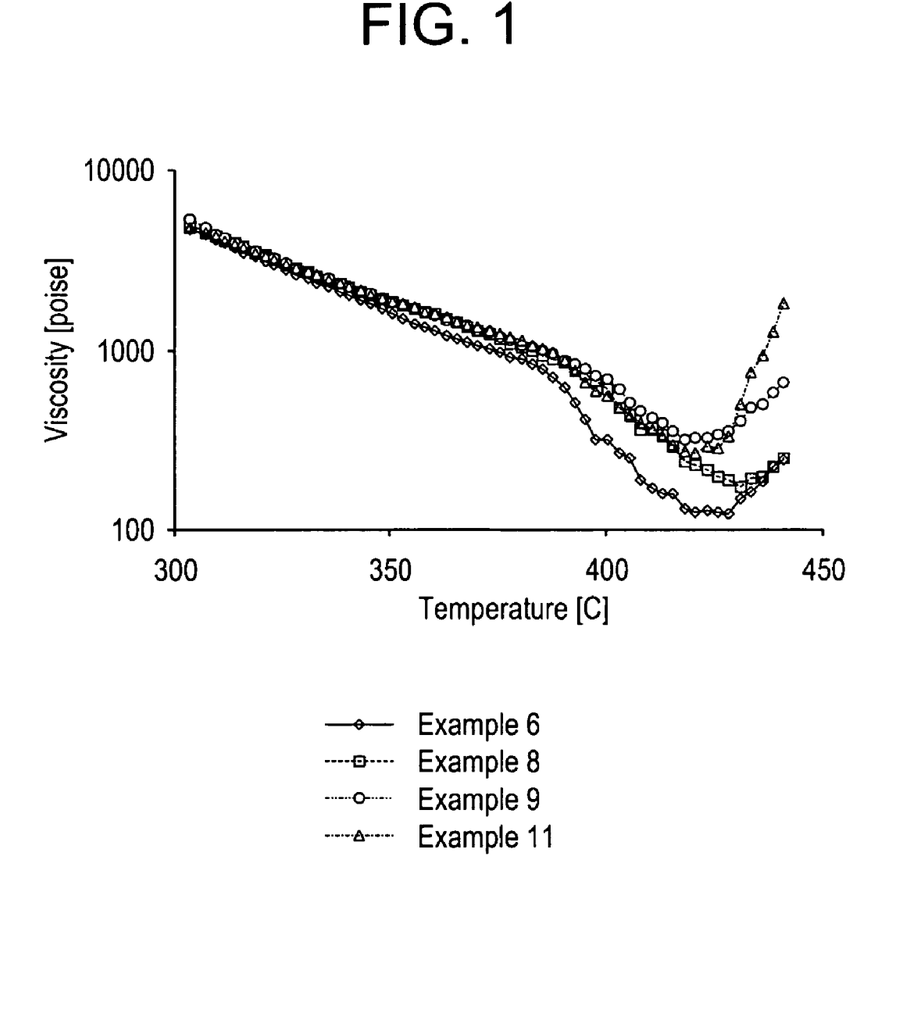
FIG. 1 is a graphical representation of temperature sweep data for some of the examples.

Table 3 also indicates that using combination of MBS I and MBS II improved polycarbonate viscosity retention during compounding extrusion and melt stability at 300° C. The melt stability improvement resulted from using MBS I and MBS II was also shown in high temperature viscosity measurement. FIG. 1 is a graphical representation of temperature sweep data obtained using a Rheometerics ARES, with a heating rate of 10° C./min, at a frequency of 2 rad/s, a strain amplitude of 9%, and heated by hot air. FIG. 1 shows that Example 9, which has the combination of MBS I and MBS II in a weight ratio of 1.2:1.8, shows the best melt stability at temperature around 400° C.

Examples 12–19

Compositions as shown in Table 4 were produced by melt blending the components. The composition was pelletized and then formed into the appropriate test specimens. Flame retardancy was tested on specimens with a thickness of 1.1 mm. Data is shown in Table 4.

TABLE 4

| Component | 12* | 13* | 14 | 15 | 16 | 17 | 18 | 19 |
|---|---|---|---|---|---|---|---|---|
| Polycarbonate I | 50 | 50 | 50 | 50 | 50 | 50 | 50 | 50 |
| Polycarbonate II | 50 | 50 | 50 | 50 | 50 | 50 | 50 | 50 |
| Irgofos 168 | 0.05 | 0.05 | 0.05 | 0.05 | 0.05 | 0.05 | 0.05 | 0.05 |
| PETS | 0.35 | 0.35 | 0.35 | 0.35 | 0.35 | 0.35 | 0.35 | 0.35 |
| TSAN | 0.2 | 0.2 | 0.2 | 0.2 | 0.2 | 0.2 | 0.2 | 0.2 |
| C4 K-RIMAR | 0.025 | 0.025 | 0.025 | 0.025 | 0.025 | 0.025 | 0.025 | 0.025 |
| MBS I | 0 | 2.5 | 2 | 1.5 | 1 | 0.5 | 0 | 2.5 |
| MBS II | 0 | 0 | 0.5 | 1 | 1.5 | 2 | 2.5 | 0 |
| 45% H3PO4 | 0 | 0 | 0 | 0 | 0 | 0 | 0 | 0.00035 |
| DI Water | 0 | 0 | 0 | 0 | 0 | 0 | 0 | 0.05 |
| pH of impact modifier | — | 7.2 | 6.5 | 5.8 | 4.7 | 3.8 | 3.5 | 6.8 |
| | | | UL94 V0–V2 at 1.1 mm | | | | | |
| 5-Bar FOT | 43.5 | 73.5 | 42.5 | 31 | 25 | 25 | 41 | 27.5 |
| Rating | V2 | V1 | V1 | V0 | V0 | V0 | V1 | V0 |

*Comparative Example

Examples 15, 16, 17 have V0 rating according to UL94. Example 19 confirms once again that adding a weak acid into a MBS I impact modified polycarbonate composition results in significant improvement in flame retardance performance (as compared to Example 13).

It is surprisingly noted that Example 12, which contains the same flame retardance additive package but without any MBS, dripped in the flame test, while all the other batches containing MBS did not drip at all in the same test. This suggests that at properly adjusted pH level and low loading level, MBS could have anti-dripping function.

Figure 4:
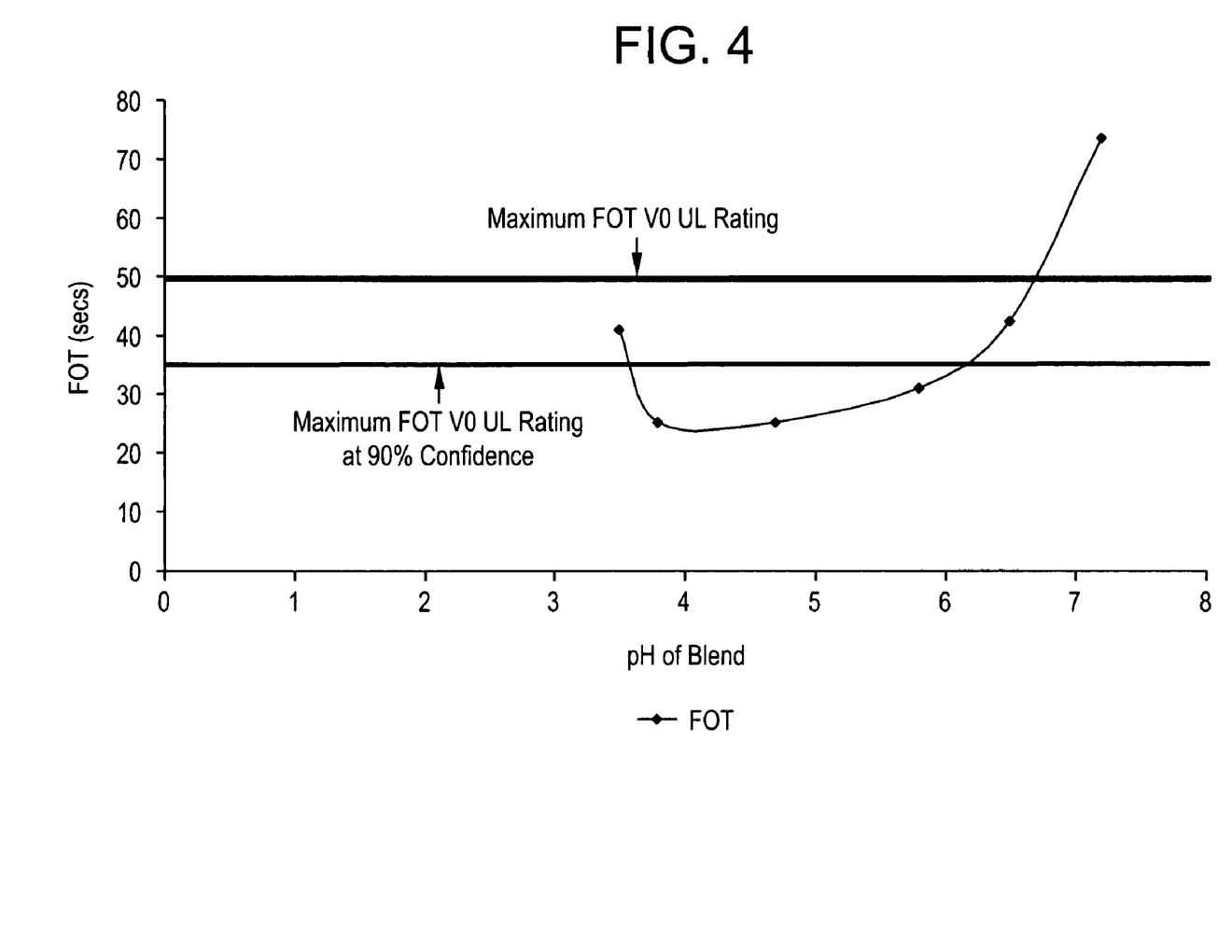
FIG. 4 is a graph relating flame out time to pH for the data in Table 4.

FIG. 4 is a graph relating the pH of the Examples in Table 4 to the flame retardance performance. FIG. 4 shows a clear relationship between the pH of the impact modifier or impact modifier blend and the UL94 rating.

Examples 20–25

Compositions as shown in Table 5 were produced by melt blending the components. The composition was pelletized and then formed into the appropriate test specimens. Flame retardancy was tested on specimens with a thickness of 1.1 mm. Data is shown in Table 5.

TABLE 5

| Component | 20* | 21 | 22 | 23 | 24 | 25 |
|---|---|---|---|---|---|---|
| Polycarbonate I | 50 | 50 | 50 | 50 | 50 | 50 |
| Polycarbonate II | 50 | 50 | 50 | 50 | 50 | 50 |
| Irgofos 168 | 0.05 | 0.05 | 0.05 | 0.05 | 0.05 | 0.05 |
| PETS | 0.35 | 0.35 | 0.35 | 0.35 | 0.35 | 0.35 |
| TSAN | 0.2 | 0.2 | 0.2 | 0.2 | 0.2 | 0.2 |
| C1 K-RIMAR | 0.03 | 0.03 | 0.03 | 0.02 | 0.03 | 0.04 |
| MBS I | 2.5 | 0 | 1.5 | 1 | 1 | 1 |
| MBS II | 0 | 2.5 | 1 | 1.5 | 1.5 | 1.5 |
| UL94 V0–V2 at 1.1 mm | | | | | | |
| 5-Bar FOT | 41 | 49 | 39 | 28 | 29 | 14 |
| Rating | V1 | V1 | V1 | V0 | V0 | V0 |

*Comparative Example

Examples 20 through 25 demonstrate that comparable results are obtained using potassium perfluorobutane sulfonate and potassium perfluoromethane sulfonate.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A thermoplastic composition comprising polycarbonate, an impact modifier having a pH of about 3 to about 7, and a single flame retardant consisting of a a salt based flame retardant or a combination of salt based flame retardants, wherein said flame retardant or flame retardant combination essentially free of bromine and chlorine,
    wherein the polycarbonate is present in an amount of 95 to 99 weight percent, based on the total weight of the polycarbonate and the impact modifier,
    wherein the impact modifier is present in an amount of 1 to 5 weight percent, based on the total weight of the polycarbonate, and
    wherein the salt based flame retardant is present in an amount of 0.005 to 2 weight percent, based on the weight of the polycarbonate.

2. The composition of claim 1, wherein the composition has a UL94 rating of V1 at a thickness of about 1 to about 1.5 millimeters.

3. The composition of claim 1, wherein the composition has a UL94 rating of V0 at a thickness of about 1 to about 1.5 millimeters.

4. The composition of claim 1, wherein the composition is essentially free of chlorine and bromine.

5. The composition of claim 1, wherein the polycarbonate is based on bisphenol A.

6. The composition of claim 1, wherein the impact modifier is an acrylate impact modifier or a diene rubber impact modifier.

7. The composition of claim 1, wherein the impact modifier is selected from the group consisting of methacrylate-butadiene-styrene, poly(butyl-acrylate)-methyl-methacrylate, poly(butyl-acrylate cosiloxane)-methyl-methacrylate and combinations of two or more of the foregoing.

8. The composition of claim 1, wherein the impact modifier comprises methacrylate-butadiene-styrene.

9. The composition of claim 1, wherein the impact modifier comprises a mixture of two methacrylate-butadiene-styrene resins having different pH values.

10. The composition of claim 1, wherein the impact modifier has a pH of about 3.4 to about 6.0.

11. The composition of claim 1, wherein the flame retardant is selected from the group consisting of sodium, potassium, or tetraethyl ammonium perfluoromethylbutane sulfonate; sodium, potassium, or tetraethyl ammonium perfluoromethane sulfonate; sodium, potassium, or tetraethyl ammonium perfluoroethane sulfonate; sodium, potassium, or tetraethyl ammonium perfluoropropane sulfonate; sodium, potassium, or tetraethyl ammonium perfluorohexane sulfonate; sodium, potassium, or tetraethyl ammonium perfluoroheptane sulfonate; sodium, potassium, or tetraethyl ammonium perfluoroctanesulfonate; sodium, potassium, or tetraethyl ammonium perfluorobutane sulfonate; and sodium, potassium, or tetraethyl ammonium diphenylsulfon-3-sulfonate; and mixtures of two or more of the foregoing salts.

12. The composition of claim 1, wherein the flame retardant is selected from the group consisting of potassium diphenylsulfon-3-sulfonate, potassium perfluorobutane-sulfonate, potassium perfluoromethane-sulfonate and combinations comprising two or more of the foregoing.

13. The composition of claim 1, wherein the flame retardant is present in an amount of about 0.005 to about 2 weight percent, based on the weight of the polycarbonate.

14. The composition of claim 1, wherein the composition further comprises polytetrafluoroethylene encapsulated in styrene acrylonitrile resin.

15. The composition of claim 1, wherein the composition further comprises an additive selected from the group consisting of reinforcing agents; heat stabilizers; antioxidants; light stabilizers; plasticizers; antistatic agents; mold releasing agents; additional resins; blowing agents and combinations of two or more of the foregoing.

16. The composition of claim 1, wherein the impact modifier is a combination of two impact modifiers having different pH values.

17. The composition of claim 1, wherein the pH of the impact modifier has been modified using acid or base.

18. The composition of claim 1, wherein the composition has a ductile-brittle transition temperature at or below −25° C. according to ASTM D256.

19. A thermoplastic composition consisting essentially of polycarbonate, a combination of methacrylate-butadiene-styrene impact modifiers having a combined pH of about 3 to about 7, polytetrafluoroethylene encapsulated in styrene acrylonitrile resin and a flame retardant essentially free of bromine and chlorine.

20. A method of making a thermoplastic composition comprising
adjusting the pH of an impact modifier to a value of about 3 to about 7 to make an adjusted impact modifier; and
melt mixing a mixture comprising the adjusted impact modifier, polycarbonate, and a flame retardant essentially free of chlorine or bromine.

21. The method of claim 20, wherein the impact modifier is an acrylate impact modifier or a diene rubber impact modifier.

22. The method of claim 20, wherein the impact modifier is selected from the group consisting of methacrylate-butadiene-styrene, poly(butyl-acrylate)-methyl-methacrylate, poly(butyl-acrylate cosiloxane)-methyl-methacrylate and combinations of two or more of the foregoing.

23. The method of claim 20, wherein the impact modifier comprises methacrylate-butadiene-styrene.

24. The method of claim 20, wherein the impact modifier comprises a mixture of two methacrylate-butadiene-styrene resins having different pH values.

25. The method of claim 20, wherein the impact modifier has a pH of about 3.4 to about 6.0.

26. The method of claim 20, wherein the flame retardant is a salt based flame retardant.

27. The method of claim 20, wherein the flame retardant is selected from the group consisting of potassium diphenylsulfon-3-sulfonate, potassium perfluorobutane-sulfonate, potassium perfluoromethane-sulfonate and combinations comprising two or more of the foregoing.

28. The method of claim 20, wherein the mixture further comprises polytetrafluoroethylene encapsulated in styrene acrylonitrile resin.

29. The method of claim 20, wherein the impact modifier is a combination of two impact modifiers having different pH values.

30. The method of claim 20, wherein the pH of the impact modifier has been modified using acid or base.

31. The method of claim 30, wherein the acid is one or more acids selected from the group consisting of phosphoric acid, phosphorous acid, hypophosphorous acid, phosphinic acid, phosphonic acid, metaphosphoric acid, hexametaphosphoric acid, thiophosphoric acid, fluorophosphoric acid, difluorophsphoric acid, fluorophosphorous acid, difluorophosphorous acid, fluorohypophosphorous acid, and fluorohypophosphoric acid.

32. A thermoplastic composition comprising polycarbonate, an impact modifier having a pH of about 3 to about 7, and a flame retardant essentially free of bromine and chlorine, wherein the impact modifier is a combination of two impact modifiers having different pH values.

33. A thermoplastic composition comprising polycarbonate, an impact modifier having a pH of about 3 to about 7, and a flame retardant essentially free of bromine and chlorine, wherein the pH of the impact modifier has been modified using acid or base.

* * * * *